Figure 1:
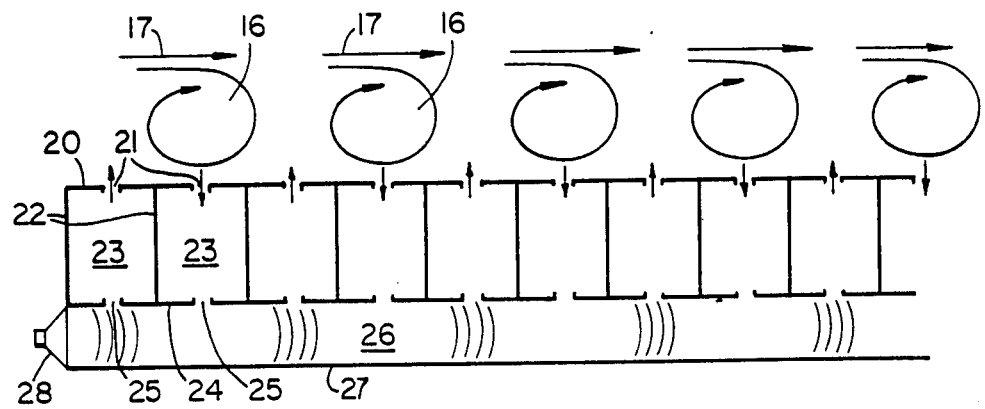

United States Patent [19]

Williams et al.

[11] Patent Number: 4,693,201

[45] Date of Patent: Sep. 15, 1987

[54] LOW DRAG SURFACE CONSTRUCTION

[75] Inventors: John E. F. Williams; Jack Lang, both of Cambridge, England

[73] Assignee: Rolls-Royce plc, London, England

[21] Appl. No.: 796,945

[22] Filed: Sep. 12, 1985

[30] Foreign Application Priority Data

Sep. 13, 1984 [GB] United Kingdom ............... 8423140

[51] Int. Cl.⁴ ............................................ B61D 35/00
[52] U.S. Cl. .................................. 114/67 R; 114/290; 244/130; 244/208
[58] Field of Search ............... 114/67 R, 288–290; 244/130, 207–209

[56] References Cited

U.S. PATENT DOCUMENTS

| 2,318,789 | 5/1943 | Lombardini | 114/67 R |
| 2,361,071 | 10/1944 | Vang | 114/67 R |
| 2,742,247 | 4/1956 | Lachmann | 244/130 |
| 2,783,008 | 2/1957 | Bodine | 244/130 |
| 2,899,150 | 8/1959 | Ellis | 244/130 X |
| 2,946,541 | 7/1960 | Boyd | 244/130 X |
| 4,214,722 | 7/1980 | Tamura | 244/208 |
| 4,434,957 | 3/1984 | Moritz | 244/130 X |

FOREIGN PATENT DOCUMENTS

WO83/01421 10/1982 PCT Int'l Appl.

Primary Examiner—David H. Brown
Attorney, Agent, or Firm—Cushman, Darby & Cushman

[57] ABSTRACT

A low drag surface construction utilizes a plurality of longitudinally extending, parallel, spaced apart linear vortices extending transversely of the free stream to reduce drag between the free stream and the surface. The surface is provided with stabilizing means which retains the vortices in their relationship with one another but causes them to traverse the surface in the same direction as the free stream but at approximately half the speed. The stabilizing produces a regular variation in boundary flow across the surface and may comprise dynamic means such as sequenced jets of fluid escaping from apertures in the surface.

5 Claims, 2 Drawing Figures

LOW DRAG SURFACE CONSTRUCTION

This invention relates to a low drag surface construction.

For any surface over which a fluid flows, drag is caused between the fluid flow and the surface. The basic cause of this drag is friction in a boundary layer in which the velocity of the fluid flow is reduced to a varying degree from that of the free stream of fluid. This friction requires the expenditure of energy, which appears as heat, and the energy thus expended is lost.

Drag is generally undesirable, since it wastes energy and reduces the efficiency of the fluid flow device of which the surface in question forms a part. The device involved may comprise any one of a number of possibilities, amongst which are gas turbine engines, aircraft and ships (in the latter case the fluid is water while in the first two cases the fluid is air or gas).

Because of the undesirable nature of drag, there have been various attempts to reduce it, usually by treatment of the boundary layer itself. In some instances the boundary layer has been sucked away, while in some other cases the boundary layer has been energised by blowing fluid into it in the direction of the general fluid flow. These expedients have met with some success, but there are considerable difficulties in putting them into practice which have precluded their general application.

The present invention relates to an alternative form of low drag surface.

According to the present invention a low drag surface construction comprises stabilising means which produces a regularly spaced variation in boundary flow across the surface so as to stabilise a plurality of linear vortices in parallel spaced apart relationship and extending transverse to the general direction of flow across the surface, and which varies the boundary flow to cause the vortices to move in the direction of the general flow and at a speed approximately half that of the free stream.

Said stabilising means may mimic a mechanical means by a fluid dynamic means; thus it may simulate surface waves which travel along the surface by suitably situated apertures in the surface and energising means which cause fluid to escape out of or enter in through the apertures in sequence.

Figure 2:
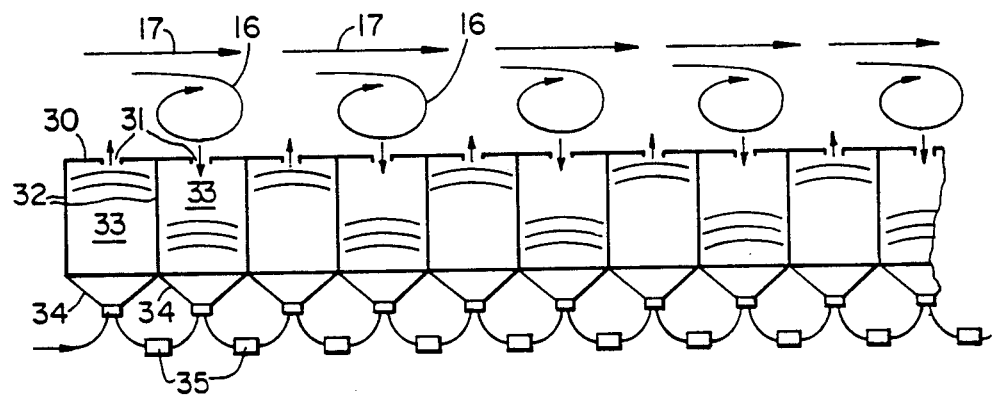

The invention will now be particularly described, merely by way of example, with reference to the accompanying drawings in which:

FIG. 1 is a section through a low drag surface in accordance with the invention, and FIG. 2 is a section through an alternative embodiment of low drag surface in accordance with the invention.

In FIG. 1 the low drag surface includes an apertured, rigid skin 20. The apertures 21 are slits which extend laterally, although they could be replaced by rows of closely adjacent small holes. Behind the skin 20 a series of partitions 22 divide the back face into a number of separate cells 23, each having a single aperture 21, extending therefrom. A back skin 24 provides a rearward wall for the cells 23, and like the skin 20 this back skin 24 is apertured at 25 to allow each cell 23 to communicate with a channel 26 formed between the back skin 24 and a base sheet 27. The apertures 25 are again laterally extending slits, but could as in the case of the apertures 21 comprise rows of adjacent holes.

To actuate this system, an acoustic transducer or series of transducers 28 is mounted at the upstream end of the channel 26, and is energised by means not illustrated to produce a series of fluid wavelets which move along the channel. These wavelets will be recognised as being the normal output of such a transducer in such a channel, and the output of the transducer is in fact a wave propagating at less than the speed of sound because of enclosed structure of the channel.

As the wavelets pass the apertures 25 they are transmitted into the cells 23, and by choosing the dimensions of the cells correctly it is possible to arrange that the cells resonate to amplify the effect of the transducer driven motion in the channel.

Consequently, strong pulsations of fluid are caused through the apertures 21 and into and out of the cells 23.

The spacing of the apertures 21 is arranged such that as the fluid is pulsing out of the first cell 23 it is pulsing into the next, and out of the next and so on down the series. As the wavelets pass down the channel 26 so the pulsation out of the first cell 23 changes to become a pulsation inwards, and the remaining cells also alter. The overall effect is as if each pulsation moves down the series of apertures 21 at the speed of the wavelets in the channel 26.

It will be appreciated that the inward pulsation into one cell 23 and the outward pulsations from neighbouring cells provide a boundary flow similar to a mechanical surface contour and a similar effect will be achieved in relation to a series of parallel, longitudinally extending vortices.

Thus each vortex will tend to stablise in the area adjacent to a cell 23 experiencing an inward flow and as the situation alters so that the region of inward flow appears to travel downstream across the surface so the vortices will also be caused to move downstream.

Operation of this embodiment as a low-drag device depends upon the vortices 16 acting in a manner similar to the rolling elements of rolling element bearings in mechanical devices. Thus the portion of the vortex adjacent the free stream is enabled to move at approximately the free-stream velocity C by the precession of the vortices along the surface at their velocity of approximately C/2 impressed by the motion of the waves along the surface. This is of course the normal roller relationship and can be derived by considering the instantaneous situation where the point of contact between roller and surface has zero velocity, the centre of the roller has a velocity of C/2, and the upper part of the periphery of the roller must thus have twice this velocity, i.e. its velocity is C.

The arrangement therefore ensures that there is little shear between the vortices and the free stream, and again only relatively little shear between the lower part of the vortical flow and the adjacent surface. Hence the drag between fluid and surface is reduced.

In some circumstances the vortices may be self-forming due to the characteristics of the surface and the flow over it. In other cases the vortices could be positively formed by a known separate device, such as a cylinder rotating parallel to the surface, or an oscillating fence or ramp on the surface. However formed, the requirement is that upon formation the vortices should follow one another down the surface in the direction of fluid flow and that they should all rotate in the same sense.

One problem with the embodiment of FIG. 1 arises from the fact that the apparent speed of traverse of the regions of inward flow across the surface is equal to the speed of travel of the wavelets produced by the transducer 28 in the channel 26. This speed is less than, but sometimes comparable with the local speed of sound, and although it can be reduced by expedient such as making the channel more tortuous or filling it with a different material it is still likely that such devices will only be suitable for relatively high free flow velocities. FIG. 2 therefore illustrates an embodiment whose basic principle of operation is similar to that of FIG. 1 but which has a different drive mechanism which will enable the device to be optimised for lower free stream velocities.

In FIG. 2 the fluid contacting skin 30 is similar to the skin 20 of the previous embodiment, and once again laterally extending apertures or rows of apertures 31 are provided. The area behind the skin is again divided by wall members 32 into cells 33, each cell communicating with the fluid flow region via one of the apertures 31.

Instead of the back wall 24 and channel 26 of the previous embodiment, however, this embodiment has a plurality of separate transducers 34 one for each cell 33 and which form the rear wall of their respective cells. A signal is fed to the first transducer 34 of the sequence and is then fed via delay device 35 to the next transducer in sequence and so on. In this way the fluid motions in adjacent cells may be arranged to be of differing phase. If they are in antiphase the situation described in connection with FIG. 2 obtains, and by varying the delay devices 35 an infinite variation of phase difference could be arranged.

In this way, by varying the frequency produced by the transducers and their phase differences it is possible to vary the apparent speed of the waves of inward and outward flow travelling along the series of apertures 31 and the 'wavelength' of these waves. The former may be arranged to approximate to half the free stream speed, while the latter may be altered to suit the optimum size of vortex, which will itself depend upon the fluid involved. Although more complex, therefore, this embodiment provides considerable flexibility of conditions which may make it suitable for experimental or development use.

It should be noted that the transducers 28 and 34 could comprise devices like loudspeakers or the less bulky and less fragile transducers of the piezo-electric or magnetostrictive type.

We claim:

1. A surface construction subject to drag caused by a fluid stream thereacross having a plurality of linear vortices extending parallel with, and adjacent thereto, said surface construction comprising: vortex stabilizing means for producing a regularly spaced variation in boundary flow streamwise of said surface construction to thereby stabilize the plurality of linear vortices in parallel spaced apart relationship to each other transverse of the boundary flow streamwise of the surface construction, said vortex stabilizing means including a plurality of apertures in said surface construction, energizing means coupled to said apertures to cause fluid to ingress and egress in a predetermined sequence with respect to neighboring apertures, and said variation in boundary flow causing said linear vortices to roll streamwise, at approximately half of freestream speed to thereby minimize drag.

2. A surface construction according to claim 1, further comprising a plurality of cells formed adjacent said surface construction, each of said cells having communication with at least one of said plurality apertures.

3. A surface construction according to claim 2, further comprising a channel serially connected with said cells, said energising means comprising a transducer for setting up travelling waves within said channel.

4. A surface construction according to claim 2 in which said energising means comprises a plurality of transducers for setting up wave motion of fluid within said cells, each of said cells being provided with a respective one of said transducers.

5. A surface construction according to claim 4 in which said transducers are driven by means of electrical signals and are serially connected to each other through delay lines whereby each of said transducers has a predetermined phase relationship with its neighbours.

* * * * *